United States Patent
Hedvall et al.

(10) Patent No.: US 12,066,144 B2
(45) Date of Patent: Aug. 20, 2024

(54) PIPE STRUCTURE AND METHOD FOR PRODUCING A PIPE STRUCTURE OF THIS TYPE

(71) Applicant: Alleima GmbH, Werther (DE)

(72) Inventors: Christofer Hedvall, Bielefeld (DE); Tomas Froböse, Düsseldorf (DE)

(73) Assignee: Alleima GmbH, Werther (DE)

( * ) Notice: Subject to any disclaimer, the term of this patent is extended or adjusted under 35 U.S.C. 154(b) by 463 days.

(21) Appl. No.: 17/432,555

(22) PCT Filed: Feb. 14, 2020

(86) PCT No.: PCT/EP2020/053993
§ 371 (c)(1),
(2) Date: Sep. 7, 2021

(87) PCT Pub. No.: WO2020/169491
PCT Pub. Date: Aug. 27, 2020

(65) Prior Publication Data
US 2022/0146021 A1    May 12, 2022

(30) Foreign Application Priority Data
Feb. 22, 2019   (DE) ..................... 10 2019 104 536.3

(51) Int. Cl.
*F16L 9/04*    (2006.01)
*F16L 9/14*    (2006.01)
*F16L 57/02*   (2006.01)

(52) U.S. Cl.
CPC .................. *F16L 9/04* (2013.01); *F16L 9/14* (2013.01); *F16L 57/02* (2013.01)

(58) Field of Classification Search
CPC .............. F16L 9/147; F16L 9/18; F16L 57/02
(Continued)

(56) References Cited

U.S. PATENT DOCUMENTS 2,438,146 A * 3/1948 Candee .................. F16L 11/16
174/109
4,173,670 A * 11/1979 VanAuken ................ B32B 1/08
138/131

(Continued)

FOREIGN PATENT DOCUMENTS

| DE | 102005028766 A1 | 1/2007 |
|----|-----------------|--------|
| JP | H02-135787 U    | 11/1990 |
| JP | 2010-502911 A   | 1/2010 |

OTHER PUBLICATIONS

International Search Report (with partial translation) and Written Opinion dated May 13, 2020, issued in corresponding International Patent application No. PCT/EP2020/053993.

(Continued)

*Primary Examiner* — Patrick F Brinson
(74) *Attorney, Agent, or Firm* — Morgan, Lewis & Bockius LLP

(57) ABSTRACT

The present disclosure concerns a pipe structure for high-pressure applications. To provide a pipe structure which overcomes at least one of the disadvantages of the pipes known from the state of the art, it is proposed according to the disclosure that the pipe structure has an inner pipe comprising a metal, wherein the inner pipe has an inner surface and an outer surface, at least one strand which surrounds the outer surface of the inner pipe and has a plurality of yarns, wherein at least one of the yarns has carbon fibres, and a protective pipe surrounding the strand and the inner pipe.

23 Claims, 1 Drawing Sheet

(58) Field of Classification Search
USPC .................................. 138/127, 131, 143, 172
See application file for complete search history.

(56) References Cited

U.S. PATENT DOCUMENTS

| | | | |
|---|---|---|---|
| 4,559,974 A | 12/1985 | Fawley | |
| 6,053,213 A * | 4/2000 | Jung ................... | F16L 11/083 |
| | | | 138/131 |
| 6,110,550 A * | 8/2000 | Jarrin ................... | F16L 11/083 |
| | | | 138/146 |
| 6,354,334 B1 | 3/2002 | Ellyin et al. | |
| 7,493,918 B2 * | 2/2009 | Thomson ............... | F16L 11/22 |
| | | | 138/131 |
| 8,418,337 B2 | 4/2013 | Salama | |
| 8,479,777 B2 * | 7/2013 | Weil ..................... | F16L 11/083 |
| | | | 428/36.9 |
| 11,643,539 B2 * | 5/2023 | Burrowes ............... | B32B 27/12 |
| | | | 138/127 |
| 2009/0025815 A1 | 1/2009 | Becks et al. | |

OTHER PUBLICATIONS

Office Action dated Jan. 10, 2024, issued in corresponding Japanese Patent Application No. 2021-549270.

\* cited by examiner

PIPE STRUCTURE AND METHOD FOR PRODUCING A PIPE STRUCTURE OF THIS TYPE

TECHNICAL FIELD

The present disclosure concerns a pipe structure, a method of producing such a pipe structure and a use of such a pipe structure.

TECHNOLOGICAL BACKGROUND

Pipes, in particular pipes of metal, are used in various areas in technology, in which they are exposed to high levels of loading. Examples of such areas in technology are injection moulding technology for internal combustion engines and the chemical industry. Here the demand on the pipes is in particular being able to withstand high pressures over a long period of time.

Pipes for high-pressure applications which can withstand pressures of over 12,000 bars are already known from the state of the art. At such high pressures the pipe is subjected to a very high loading which can lead to the formation of cracks in the pipe. The cracking gives rise to the risk that the pipe fails and in the worst-case scenario pipe rupture occurs.

It is known that with a material composition that remains the same the pressure resistance of a pipe increases with its wall thickness as the propagation of a crack from the inner surface of the pipe to the outer surface of the pipe takes longer with an increasing wall thickness. Therefore thick-walled pipes are generally used for high-pressure applications. The wall thickness of the pipe increases towards higher pressures. However increasing wall thicknesses with the same inside diameter result in the outside diameter and the inherent weight of the pipe also increasing. That is found to be a disadvantage in many applications, for example in use in land vehicles and aircraft.

SUMMARY

There is therefore a need for a pipe structure which overcomes at least one of the above-mentioned disadvantages. In addition there is a need for a pipe structure which can withstand even higher pressures in comparison with the pipes known from the state of the art. In addition there is a need for a method of producing such a pipe structure.

According to a first aspect of the present disclosure therefore there is provided a pipe structure which has an inner pipe comprising a metal, wherein the inner pipe has an inner surface and an outer surface, at least one strand which surrounds the outer surface of the inner pipe and has a plurality of yarns, wherein at least one of the yarns has carbon fibres, and a protective pipe surrounding the strand and the inner pipe.

The pipe structure according to the present disclosure is based on the idea of reinforcing the inner pipe with the at least one strand surrounding the inner pipe. In an embodiment in that way the pipe structure can withstand higher pressures than the pipes known from the state of the art. In addition an embodiment makes it possible to achieve a longer service life for the pipe structure at high pressures. In addition in an embodiment the pipe structure according to the present disclosure increases the force-locking connection between the protective pipe and the inner pipe. In an embodiment of the disclosure the pipe structure withstands pressures of 15,000 bars or more.

The failure of a pipe and pipe rupture frequently begin with a critical growth of a crack, in respect of which for example a crack is propagated from the pipe inner surface to the pipe outer surface. According to the present disclosure the at least one strand encloses the inner pipe and by virtue of the properties of the carbon fibres contained therein at least in an embodiment reduces the risk of cracks being formed at high pressures in the inner pipe and such cracks being propagated in the material of the inner pipe. That reduces the risk of failure of the entire pipe structure in comparison with the pipes known from the state of the art.

By virtue of the use of the at least one strand having a plurality of yarns, wherein at least one of yarns has carbon fibres, the wall thickness of the entire pipe structure and thus the structural space that the pipe structure takes up can be reduced in a embodiment in relation to the pipes known from the state of the art for high-pressure applications with a comparable pressure strength. The wall thickness of the pipe structure according to the present disclosure is calculated as the difference between the outside diameter of the protective pipe and the inside diameter of the inner pipe.

In addition a pipe structure according to the present disclosure is lighter compared to a solid pipe with the same inside and outside diameters. The latter by virtue of the lower material density of carbon fibres in relation to metals.

Carbon fibres in accordance with the present disclosure are also referred to as carbon-based fibres or graphite fibres. They are produced industrially and converted into carbon arranged in graphite-like fashion by chemical reactions adapted to the raw material. Carbon fibres have high strength levels and stiffness with at the same time a low elongation at rupture in the axial direction.

A large number of carbon fibres are combined together to form a yarn for further processing. Such yarns with carbon fibres are also referred to as multi-filament yarns or rovings. According to the present disclosure the term yarn then includes a long thin structure. A yarn in accordance with the present disclosure in an embodiment, besides the carbon fibres, can also have fibres of one or more other materials. The yarn serves as an intermediate product for the production of a strand in accordance with the present disclosure.

In an embodiment of the present disclosure the at least one strand is selected from a woven fabric, a mesh fabric, a knitted fabric and a multi-axial fabric or any combination thereof.

The at least one strand which has a plurality of yarns, in an embodiment, additionally also contains one or more yarns comprising or having one or more other materials than carbon fibres.

By way of example in an embodiment the strand additionally has a yarn having fibres of a material with at least one property different from the properties of the carbon fibres. Such an additional property can have a positive effect on the characteristics of the pipe structure.

In an embodiment of the present disclosure the at least one strand is of a tubular or stocking-like configuration. The tubular or stocking-like configuration ensures that the strand can surround the inner pipe in the peripheral direction.

In an embodiment of the present disclosure the at least one strand contains a proportion of at least 50% carbon fibres.

In an embodiment of the present disclosure the at least one strand has a proportion of at least 90% carbon fibres.

In an embodiment of the present disclosure the at least one strand completely consists of carbon fibres.

In an embodiment the elongation of the inner pipe is greater than the elongation of the at least one strand while at the same time the tensile strength of the at least one strand is greater than that of the inner pipe.

A pipe but also a pipe structure in accordance with the present disclosure is a hollow body which is extended in a longitudinal direction and the length of which in an embodiment is substantially greater than its diameter. In an embodiment a pipe but also a pipe structure in accordance with the present disclosure is a hollow-cylindrical body which is extended in the longitudinal direction. In that respect it is decisive for the function as a pipe or pipe structure in accordance with the present disclosure that in the interior of the body there is a free cross-section for conveying a fluid, that is to say a liquid or a gas.

In an embodiment of the present disclosure the inner pipe is a seamless pipe, that is to say a pipe without a (weld) seam in a longitudinal direction of the pipe. The advantages of a seamless pipe over a pipe which is welded in the longitudinal direction are an increase in the service life of the pipe, the possibility of achieving a lower weight with the same strength and better quality in respect of the inner surface. In the comparison of a welded pipe and a seamless pipe of the same outside diameter and a same wall thickness the seamless pipe withstands higher ring stresses. It is thus possible to produce a seamless pipe which in comparison with a welded pipe is of a smaller wall thickness but can withstand equal ring stresses. For that reason it is possible to save on both material and also weight. Accordingly a combination comprising a seamless pipe and the use of the at least one strand surrounding the outer surface of the inner pipe can additionally have an advantageous effect in terms of a small wall thickness and a reduction in weight in comparison with pipes for high-pressure applications known from the state of the art.

In an embodiment of the present disclosure the inner pipe is a pipe welded in its longitudinal direction.

In an embodiment of the present disclosure the inner pipe is a cold-formed pipe. Work hardening of the metal of the inner pipe is achieved by a cold forming operation. The work hardening effect makes it possible to increase the strength of the material and thus also the tensile strength as well as the pressure resistance of the formed inner pipe. In that respect the term tensile strength is used to denote the maximum mechanical tensile stress that the material of the inner pipe withstands before it tears or breaks. In that way the properties of the pipes produced in that way can be deliberately modified by the cold forming operation and the cold work hardening related thereto. The term cold forming in accordance with the present disclosure is used to denote forming at a temperature which is lower than the recrystallisation temperature of the metal.

In an embodiment of the present disclosure the inner pipe is auto-fretted.

In an embodiment of the present disclosure the inner surface of the inner pipe is burnished.

Different metallic materials are used for the production of pipes and other components in high-pressure technology. In an embodiment of the present disclosure a material of the inner pipe is selected from a carbon steel, a low-alloy steel and a high-alloy steel. In particular high dynamic pressure resistance is achieved in the case of a pipe of high-alloy steel, which was work-hardened or annealed and finally burnished at least on the inner surface of the inner pipe.

In an embodiment of the present disclosure the inner pipe is a stainless steel pipe. In an embodiment of the present disclosure the inner pipe comprises an austenitic stainless steel.

In an embodiment of the present disclosure the inner pipe is corrosion-resistant. That feature is advantageous for the use of pipes for high-pressure applications as incipient corrosion, that is to say progressive damage to the inner pipe, would lead to the pressure resistance thereof being adversely affected.

In a further embodiment of the disclosure the work-hardened inner pipe has a tensile strength (Rm) of at least 900 MPa. In an embodiment the work-hardened inner pipe has a tensile strength (Rm) of at least 1100 MPa.

In an embodiment of the present disclosure the inner pipe comprises an austenitic stainless steel having in % by weight: $C \leq 0.08$, $8 \leq Mn \leq 10$, $Si \leq 1$, $P \leq 0.06$, $S \leq 0.03$, $19 \leq Cr \leq 21$, $5 \leq Ni \leq 7$, $0.15 \leq N \leq 0.4$, $1.5 \leq Mo \leq 3$, with the balance Fe and usually occurring impurities. In an embodiment of that material expressed in % by weight $C \leq 0.040$. In a further embodiment of the present disclosure the inner pipe comprises an austenitic stainless steel comprising in % by weight: $C \leq 0.08$, $8 \leq Mn \leq 10$, $Si \leq 1$, $P \leq 0.03$, $S \leq 0.03$, $19 \leq Cr \leq 21.5$, $5.5 \leq Ni \leq 7.5$, $0.15 \leq N \leq 0.4$, $1.5 \leq Mo \leq 3$, with the balance Fe and usually occurring impurities. In an embodiment of that material expressed in % by weight: $C \leq 0.04$.

The above-defined austenitic stainless steel is commercially available for example as 21-6-9 stainless steel from Sandvik. That steel is also referred to as UNS S21900. The material is distinguished by a high content of Mn, a low content of Ni and an addition of N. The steel is characterised by a high level of mechanical strength in the hardened state, very good impact strength even at temperatures of down to −230° C. and very good high-temperature oxidation resistance.

In an embodiment of the disclosure the inner pipe is a high-pressure pipe with an inside diameter, an outside diameter and a wall thickness. In that respect the term high-pressure pipe in accordance with the present disclosure is used to denote a pipe in which the wall thickness is equal to or greater than the inside diameter. In that respect the wall thickness of the inner pipe is defined as the difference between the outside diameter of the inner pipe and the inside diameter of the inner pipe. High-pressure pipes in accordance with the present disclosure serve in an embodiment for guiding fluids at a pressure of more than 1300 bars.

In an embodiment of the disclosure the inner pipe has a surface quality so that cracks present at least on the inner surface do not exceed a depth of 50 µm. A better surface quality also involves better resistance on the part of the inner pipe with respect to the formation, propagation and growth of cracks. Therefore the risk of bursting of the inner pipe upon being subjected to high pressures is reduced, the higher the surface quality of the inner pipe.

In an embodiment existing cracks at least one the inner surface of the inner pipe do not exceed a depth of 20 µm. In an embodiment cracks at least on the inner surface of the inner pipe do not exceed a depth of 10 µm. In an embodiment cracks present at least on the inner surface of the inner pipe do not exceed a depth of 7 µm. In an embodiment the specified limits in respect of the maximum crack depth apply not just to the inner surface but to the entire surface of the inner pipe. Such a high level of surface quality provides that existing cracks can scarcely propagate from the inner surface of the inner pipe in the direction of the outer surface of the inner pipe so that the inner pipe enjoys a high level of pressure resistance.

It is precisely at locations at which the inner pipe comes into contact with fluid carried therein that it is important to provide for a sufficiently high surface quality as just small unevenness upon contact with fluids under high pressures can lead to the formation of a crack. In an embodiment of the present disclosure therefore the surface quality of the inner surface of the inner pipe is such by processing of the inner surface, for example by burnishing, that the above-listed limit values are maintained for the maximum crack depth.

The protective pipe surrounding the at least one strand and the inner pipe protects the at least one strand from environmental influences. The protective pipe reduces for example abrasive wear of the at least one strand by material which surrounds the pipe structure in the installed state. Such environmental influences could otherwise result in weakening or destruction of the at least one strand.

In an embodiment of the disclosure the protective pipe comprises a metal. While in an embodiment of the disclosure the protective pipe and the inner pipe comprise the same material the protective pipe and the inner pipe in an alternative embodiment are of mutually different materials. The latter has the advantage that different properties for the protective pipe and the inner pipe can be specifically deliberately provided, which can be combined together in any desired fashion to obtain a pipe structure which is adapted to a given application.

In an embodiment of the disclosure the protective pipe comprises a non-ferrous metal (NF metal). In accordance with the present disclosure the term NF metal is used to denote all metals except iron as well as metal alloys, in which iron is not contained as the main element or in which the proportion of pure iron (Fe) does not exceed 50%. Examples of NF metals in this sense are copper, aluminium, aircraft aluminium, zinc, bronze and brass.

In an embodiment of the disclosure the protective pipe is a seamless pipe. It will be appreciated that at least when using a seamless pipe as the protective pipe, the inner pipe together with the at least one strand surrounding the outer surface of the inner pipe is introduced axially into the opening in the protective pipe.

In an embodiment of the disclosure the protective pipe is a pipe which is welded in the longitudinal direction thereof. The longitudinal seam welding makes it possible for the inner pipe together with the at least one strand to be more easily introduced into the protective pipe. In an embodiment in which the protective pipe comprises a metal the protective pipe is formed from a strip of metal sheet to give a longitudinally seam-welded protective pipe. In this embodiment it is possible for firstly the inner pipe together with the at least one strand surrounding the inner pipe to be put on to the metal strip and for the metal strip to be formed by bending and subsequent longitudinal seam welding to give the protective pipe surrounding the at least one strand.

In an embodiment of the present disclosure the at least one strand extends concentrically relative to the inner pipe. The protective pipe in turn extends concentrically relative to the strand and the inner pipe. Accordingly the at least one strand is between the inner pipe and the protective pipe. This situation involves a positively locking connection so that the at least one strand cannot move in the radial direction either beyond the inner pipe or the protective pipe. If there is only a positively locking connection the protective pipe, the strand and the inner pipe can move in the axial direction relative to each other.

In an embodiment of the present disclosure the protective pipe is drawn on to the inner pipe and the at least one strand. In that way between the protective pipe and the at least one strand and between the at least one strand and the inner pipe there is a tight positively locking connection in the radial direction so that the at least one strand cannot move in the radial direction with respect to the inner pipe and the protective pipe.

In an embodiment of the disclosure the protective pipe and the at least one strand are also connected together in force-locking relationship.

In an embodiment of the disclosure the protective pipe, the at least one strand and the inner pipe are connected together in force-locking relationship. The frictional forces between the protective pipe and the at least one strand on the one hand and between the at least one strand and the inner pipe on the other hand then prevent axial displacement of the at least three elements relative to each other. by virtue of the force-locking connection between the protective pipe and the at least one strand the properties of the pipe structure can be overall improved so that the pipe structure can withstand an even higher pressure and the formation, propagation and growth of cracks within the inner pipe is counteracted.

According to a further aspect of the present disclosure the pipe structure according to one of the above-described embodiments is used for carrying a fluid which is subjected to a pressure of 15,000 bars or more. In an embodiment of the disclosure the pipe structure is used for carrying a fluid which is subjected to a pressure of 18,000 bars or more.

According to a further aspect of the present disclosure there is provided a method of producing a pipe structure, wherein the method comprises the steps:
 providing an inner pipe of a metal, wherein the inner pipe has an inner surface and an outer surface,
 applying at least one strand with a plurality of yarns to the outer surface of the inner pipe, wherein at least one of the yarns has carbon fibres, and
 introducing the strand with the inner pipe into a protective pipe.

Insofar as features of the pipe structure according to embodiments of the present disclosure have been described in the preceding text the method according to the present disclosure has the corresponding steps relating to the configuration thereof. In addition an embodiment of the pipe structure according to the present disclosure can be produced with the described method.

For applying the at least one strand to the inner pipe all methods are conceivable, which provide that the at least one strand surrounds the inner pipe. By way of example the at least one strand, for example in the form of a round mesh braid like a sock or stocking can be pulled on to the inner pipe. In an embodiment of the disclosure however the application of the at least one strand to the outer surface of the inner pipe includes weaving it, braiding it or knitting it around the outer surface of the inner pipe. The weaving, knitting or braiding operation provides a positively locking connection between the at least one strand and the inner pipe so that the at least one strand can no longer move in the radial direction with respect to the inner pipe.

In an embodiment of the present disclosure the weaving, braiding or knitting operation is effected in such a way that, besides the positively locking connection in the radial direction, a force-locking or frictional-locking relationship is also produced between the at least one strand and the inner pipe. In an embodiment of the disclosure the weaving, braiding or knitting operation is effected in such a way that the at least one strand is connected to the inner pipe over the entire extent of the strand in the longitudinal direction of the pipe structure in force-locking or frictional-locking relationship.

In an embodiment of the present disclosure the provision of the inner pipe includes a cold working operation on a seamless bloom or shell to give the inner pipe. Cold forming methods are used in order to transform a hollow semi-finished article of metal, namely the bloom, to give a finished inner pipe. The inside and the outside diameter of a pipe can be changed and very accurately sized by the cold forming operation. In addition the cold forming is suitable for improving the surface properties of the pipe. In addition the cold forming operation also entails a cold work hardening effect whereby the properties of the pipes produced in that way can be modified in specifically targeted fashion. By virtue of the work hardening it is possible to increase the material strength and thus also the tensile strength of the worked pipe.

In an embodiment of the present disclosure the cold forming operation of the seamless bloom to give the inner pipe is a cold drawing operation. In an embodiment of the present disclosure the inner pipe is produced by drawing the bloom of metal through a drawing die and optionally over an internal drawing tool. The internal drawing tool can either be a stationary or a cantilever-mounted drawing core.

In an embodiment of the present disclosure the cold forming operation of the seamless bloom to give the inner pipe is a cold pilger rolling procedure.

In an embodiment of the disclosure the provision of the inner pipe includes burnishing of the inner surface of the inner pipe. Burnishing denotes a working method for producing a very high level of surface quality on a metallic component.

In an embodiment of the present disclosure a force-locking connection is produced between the protective pipe and the at least one strand by forming working of the protective pipe, wherein an inside diameter of the protective pipe prior to the cold working operation is larger than after the cold forming operation. In that case during cold forming of the protective pipe the at least one strand extends with the inner pipe in the protective pipe.

In an embodiment of the disclosure the cold forming operation is a cold drawing operation through a drawing die. In that case in an embodiment of the disclosure the protective pipe, the at least one strand and the inner pipe are drawn jointly through the die.

By virtue of that cold forming of the protective pipe in an embodiment a tight positively locking connection is produced in the radial direction between the inner pipe and the at least one strand surrounding the inner pipe and the protective pipe surrounding the strand. The at least one strand cannot move in the radial direction with respect to the inner pipe and/or the protective pipe.

In an embodiment the cold forming of the protective pipe with the at least one strand extending therein and the inner pipe provides a force-locking connection between the protective pipe and the at least one strand. In an embodiment the cold forming of the protective pipe with the at least one strand extending therein and the inner pipe provides a force-locking connection between the inner pipe and the at least one strand. In an embodiment the cold forming of the protective pipe with the at least one strand extending therein and the inner pipe provides a force-locking connection between the protective pipe, the at least one strand and the inner pipe. The frictional force between the protective pipe, the at least one strand and the inner pipe then prevents a relative movement between those elements in the axial direction.

In an embodiment of the present disclosure after cold forming of the protective pipe, the inner pipe, the at least one strand and the protective pipe are connected together over the entire extent of the at least one strand in the longitudinal direction of the pipe structure in force-locking relationship.

Rubbing of a plurality of yarns with carbon fibres against each other or a plurality of carbon fibres against each other can have the result that at least individual carbon fibres are weakened or destroyed. In that way the properties of the strand formed from the yarns is detrimentally altered, for example its tensile strength is reduced. In an embodiment in which a force-locking connection is produced between the elements of the pipe structure by cold forming of the protective pipe friction or influencing as between the individual yarns and/or between individual carbon fibres with respect to each other is therefore reduced. Accordingly the yarns or the strands within the pipe structure are protected by the cold forming of the protective pipe on the at least one strand and the inner pipe.

BRIEF DESCRIPTION OF THE FIGURES

Further advantages, features and possible applications of the present disclosure will be apparent from the description hereinafter of an embodiment and the related Figures. The description hereinafter of implementations of embodiments of the present disclosure will be better understood when they are considered in conjunction with the accompanying drawings. The illustrated implementations are not limited to the configurations described in detail. In the Figures similar elements are denoted by identical references.

DETAILED DESCRIPTION

Figure 1:
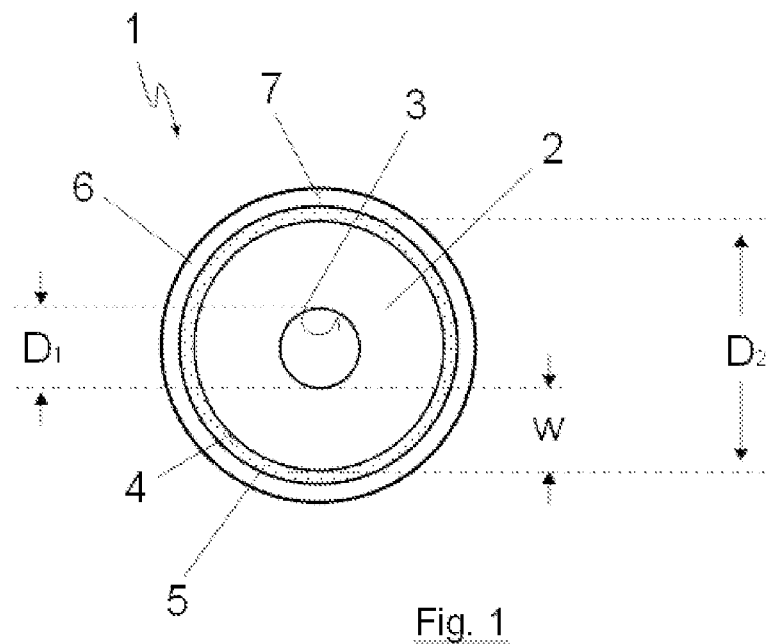
FIG. 1 shows a diagrammatic cross-sectional view of an implementation of a pipe structure according to an embodiment of the present disclosure.

FIG. 1 is a diagrammatic cross-sectional view of an implementation of the pipe structure according to an embodiment of the present disclosure. In this arrangement the pipe structure has an inner pipe 2 with an inner surface 3 and an outer surface 4. The outer surface 4 of the inner pipe 2 is surrounded in this case by a strand 5. The strand 5 is in turn surrounded by a protective pipe 6.

The inner pipe 2 is a seamless, work-hardened pipe comprising an austenitic stainless steel identified as "21-6-9". The inner pipe 2 was produced by cold drawing and by virtue of the work hardening effect produced thereby has a tensile strength of 1100 N. In addition the inner pipe 2 is of an inside diameter D1 and an outside diameter D2 as well as a wall thickness w. The wall thickness w of the inner pipe 2 is in this case larger than the inside diameter D1 of the inner pipe 2. This is therefore a high-pressure pipe. Due to cold drawing of the inner pipe 2 it has a high surface quality so that cracks present on the inner surface 3 do not exceed a depth of 10 μm.

The strand 5 comprises a plurality of yarns which in turn are produced completely from carbon fibres. In the illustrated embodiment the strand 5 is a tubular braid mesh which surrounds the inner pipe 2 in the peripheral direction like a sock.

The protective pipe 6 comprises aluminium and has a weld seam 7 extending in the longitudinal direction over the entire pipe structure 1. The protective pipe 6, the strand 5 and the inner pipe 2 are in this case connected together in force-locking relationship over the entire longitudinal direction of the pipe structure 1.

Figure 2:
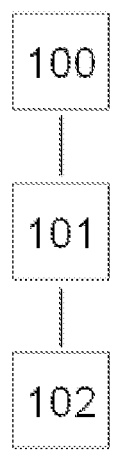
FIG. 2 shows a flow chart of an implementation of a method according to the present disclosure of producing a pipe structure in an implementation of the present disclosure.

FIG. 2 shows a flow chart illustrating implementation of the method of producing the pipe structure 1 shown in FIG. 1. In a first step 100 the inner pipe 2 is provided, by a seamless bloom comprising the austenitic stainless steel "21-6-9" being cold-formed to provide the inner pipe 2.

In that case cold forming is effected by cold drawing of the seamless bloom through a drawing die. The drawing die works the outer surface of the inner pipe and thus determines the outside diameter D2 of the inner pipe 2. In addition a drawing core is used to work the inner surface 3 of the inner pipe and thus to establish the inside diameter D1 of the inner pipe 2. The surface quality of the inner pipe 2 at least on the inner surface 3 is enhanced by burnishing by the cold drawing through the drawing die and the over the drawing core.

In a step 101 the strand 5 is applied to the outer surface 4 of the inner pipe 2 by weaving around the outer surface 4 of the inner pipe 2 with a plurality of yarns which completely consist of carbon fibres. The weaving operation produces a positively locking connection between the inner pipe 2 and the strand 5 so that the strand 5 can no longer move in the radial direction with respect to the inner pipe 2. In addition the weaving operation provides that the strand 5 and the inner pipe 2 are connected together in force-locking relationship over the entire extent of the strand 5 in the longitudinal direction of the pipe structure 1. By virtue of the frictional forces which therefore act the strand 5 can no longer move in the axial direction with respect to the inner pipe 2.

In a step 102 the strand 5 is introduced into the protective pipe 6 together with the inner pipe 2. For that purpose the protective pipe 6 is drawn on to the strand 5 and the inner pipe 2 so that in addition a close positively locking relationship is produced between the strand 5, the inner pipe 2 and the protective pipe 6 in the radial direction.

The pipe structure 1 shown in FIG. 1, obtained with the method of FIG. 2, is high-pressure resistant and is suitable for carrying fluids which are subjected to a pressure of 15,000 bars or more.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

While the disclosure has been illustrated and described in detail in the drawings and the preceding description that illustration and description is only by way of example and is not deemed to be a limitation on the scope of protection as defined by the claims. The disclosure is not limited to the disclosed embodiments.

Modifications in the disclosed embodiments are apparent to the man skilled in the art from the drawings, the description and the accompanying claims. In the claims the word 'have' does not exclude other elements or steps and the indefinite article 'a' does not exclude a plurality. The mere fact that certain features are claimed in different claims does not exclude the combination thereof. References in the claims are not deemed to be a limitation on the scope of protection.

REFERENCE NUMERALS 1 pipe structure
2 inner pipe
3 inner surface
4 outer surface
5 strand
6 protective pipe
7 weld seam
D1 inside diameter
D2 outside diameter
w wall thickness
100 providing the inner pipe
101 applying the strand to the inner pipe
102 introducing the inner pipe with the strand into the protective pipe

The invention claimed is:

1. A pipe structure which has:
an inner pipe comprising a metal, wherein the inner pipe has an inner surface and an outer surface;
at least one strand which surrounds the outer surface of the inner pipe and has a plurality of yarns, wherein at least one of the yarns has carbon fibres; and
a protective pipe surrounding the strand and the inner pipe,
wherein the inner pipe is of a surface quality such that cracks on the inner surface do not exceed a depth of 50 µm.

2. The pipe structure according to claim 1, wherein the at least one strand is selected from a woven fabric, a mesh fabric, a knitted fabric and a multi-axial fabric or any combination thereof.

3. The pipe structure according to claim 1, wherein the at least one strand is of a tubular configuration.

4. The pipe structure according to claim 1, wherein the at least one strand has a proportion of at least 50% carbon fibres.

5. The pipe structure according to claim 1, wherein the inner pipe is a high-pressure pipe with an inside diameter, an outside diameter and a wall thickness, wherein the wall thickness is equal to or greater than the inside diameter.

6. The pipe structure according to claim 1, wherein the inner pipe is a seamless pipe.

7. The pipe structure according to claim 1, wherein the inner pipe is a cold-formed pipe.

8. The pipe structure according to claim 1, wherein a material of the inner pipe is selected from a carbon steel, a low-alloy steel and a high-alloy steel.

9. The pipe structure according to claim 1, wherein the protective pipe comprises a metal.

10. The pipe structure according to claim 1, wherein at least the protective pipe and the at least one strand are connected together in force-locking relationship or the at least one strand and the inner pipe are connected together in force-locking relationship.

11. A method of transporting a fluid, the method comprising:
guiding a fluid subjected to a pressure of 15,000 bars or more through the pipe structure according to claim 1.

12. A method of producing a pipe structure, comprising the steps:
providing an inner pipe of a metal, wherein the inner pipe has an inner surface and an outer surface,
applying at least one strand with a plurality of yarns to the outer surface of the inner pipe, wherein at least one of the yarns has carbon fibres, and introducing the strand with the inner pipe into a protective pipe, wherein the application of the at least one strand to the outer surface of the inner pipe includes weaving, meshing or knitting the at least one strand around the outer surface of the inner pipe.

13. A method of producing a pipe structure, comprising the steps:

providing an inner pipe of a metal, wherein the inner pipe has an inner surface and an outer surface, applying at least one strand with a plurality of yarns to the outer surface of the inner pipe, wherein at least one of the yarns has carbon fibres, and introducing the strand with the inner pipe into a protective pipe, wherein the provision of the inner pipe includes cold forming of a seamless bloom to give the inner pipe.

14. A pipe structure which has:

an inner pipe comprising a metal, wherein the inner pipe has an inner surface and an outer surface;

at least one strand which surrounds the outer surface of the inner pipe and has a plurality of yarns, wherein at least one of the yarns has carbon fibres; and a protective pipe surrounding the strand and the inner pipe, wherein at least the protective pipe and the at least one strand are connected together in force-locking relationship or the at least one strand and the inner pipe are connected together in force-locking relationship.

15. The pipe structure according to claim 14, wherein the at least one strand is selected from a woven fabric, a mesh fabric, a knitted fabric and a multi-axial fabric or any combination thereof.

16. The pipe structure according to claim 14, wherein the at least one strand is of a tubular configuration.

17. The pipe structure according to claim 14, wherein the at least one strand has a proportion of at least 50% carbon fibres.

18. The pipe structure according to claim 14, wherein the inner pipe is a high-pressure pipe with an inside diameter, an outside diameter and a wall thickness, wherein the wall thickness is equal to or greater than the inside diameter.

19. The pipe structure according to claim 14, wherein the inner pipe is a seamless pipe.

20. The pipe structure according to claim 14, wherein the inner pipe is a cold-formed pipe.

21. The pipe structure according to claim 14, wherein a material of the inner pipe is selected from a carbon steel, a low-alloy steel and a high-alloy steel.

22. The pipe structure according to claim 14, wherein the protective pipe comprises a metal.

23. A method of transporting a fluid, the method comprising:

guiding a fluid subjected to a pressure of 15,000 bars or more through the pipe structure according to claim 14.

* * * * *